(12) United States Patent
Rodkey et al.

(10) Patent No.: US 7,685,245 B1
(45) Date of Patent: *Mar. 23, 2010

(54) DIGITAL NOTIFICATION AND RESPONSE SYSTEM

(75) Inventors: Ryan Scott Rodkey, Sugar Land, TX (US); John Frank Rodkey, Missouri City, TX (US); David Lynn Hickey, Rosharon, TX (US); Darren Lynn Ross, Sugar Land, TX (US); Ronald Frank Ramsey, St. Petersburg, FL (US)

(73) Assignee: Techradium, Inc., Sugar Land, TX (US)

( * ) Notice: Subject to any disclaimer, the term of this patent is extended or adjusted under 35 U.S.C. 154(b) by 259 days.

This patent is subject to a terminal disclaimer.

(21) Appl. No.: 11/960,497

(22) Filed: Dec. 19, 2007

Related U.S. Application Data

(63) Continuation-in-part of application No. 11/522,723, filed on Sep. 18, 2006, which is a continuation-in-part of application No. 11/117,594, filed on Apr. 28, 2005, now Pat. No. 7,130,389.

(51) Int. Cl.
*G06F 15/16* (2006.01)
*H04M 1/64* (2006.01)

(52) U.S. Cl. .................. 709/206; 709/227; 709/231; 707/10; 379/88.12

(58) Field of Classification Search .............. 709/206, 709/223, 227, 231; 707/102
See application file for complete search history.

(56) References Cited

U.S. PATENT DOCUMENTS

| | | | |
|---|---|---|---|
| 5,694,019 A | 12/1997 | Uchida et al. | |
| 6,404,880 B1 | 6/2002 | Stevens | |
| 6,442,241 B1 | 8/2002 | Tsumpes | |
| 6,463,462 B1 | 10/2002 | Smith | |
| 6,496,568 B1 | 12/2002 | Nelson | |
| 6,643,355 B1 | 11/2003 | Tsumpes | |
| 6,678,358 B2 | 1/2004 | Langsenkamp et al. | |
| 6,683,870 B1 | 1/2004 | Archer | |
| 6,697,477 B2 | 2/2004 | Fleischer | |
| 6,816,878 B1 | 11/2004 | Zimmers et al. | |
| 6,842,772 B1 | 1/2005 | Delaney et al. | |
| 6,871,214 B2 | 3/2005 | Parsons | |
| 6,912,462 B2 | 6/2005 | Dodrill | |
| 6,931,415 B2 | 8/2005 | Nagahara | |
| 6,970,535 B2 | 11/2005 | Gregory et al. | |
| 6,973,166 B1 | 12/2005 | Tsumpes | |
| 6,999,562 B2 | 2/2006 | Winick | |
| 6,999,565 B1 | 2/2006 | Delaney et al. | |
| 7,042,350 B2 | 5/2006 | Patrick et al. | |
| 7,069,271 B1 * | 6/2006 | Fadel et al. ................. 707/102 |
| 7,069,303 B2 | 6/2006 | Sikora et al. | |

(Continued)

*Primary Examiner*—Khanh Q Dinh
(74) *Attorney, Agent, or Firm*—Buskop Law Group, PC; Wendy Buskop

(57) ABSTRACT

A digital notification and response system utilizing an administrator interface to transmit a message from an administrator to a user contact device. The system comprises a dynamic information database that includes user contact data, priority information, and response data. The administrator initiates distribution of the message based upon grouping information, priority information, and the priority order. The message is transmitted through at least two industry standard gateways simultaneously to groups of user contact devices based upon priority information. Once the message is received by the user contact device, the user contact device transmits a response through the industry standard gateways back to the dynamic information database.

31 Claims, 2 Drawing Sheets

U.S. PATENT DOCUMENTS

| | | |
|---|---|---|
| 7,130,389 B1 * | 10/2006 | Rodkey et al. ............ 379/88.12 |
| 7,130,807 B1 * | 10/2006 | Mikurak ........................ 705/7 |
| 7,184,521 B2 | 2/2007 | Sikora et al. |
| 7,353,256 B2 | 4/2008 | Delaney et al. |
| 7,401,147 B2 | 7/2008 | Sikora et al. |
| 7,409,428 B1 | 8/2008 | Brabec et al. |
| 7,467,198 B2 * | 12/2008 | Goodman et al. ........... 709/223 |
| 2002/0032020 A1 | 3/2002 | Brown |
| 2002/0095414 A1 | 7/2002 | Barnett et al. |
| 2002/0156759 A1 | 10/2002 | Santos |
| 2002/0159570 A1 | 10/2002 | Langsenkamp |
| 2003/0186716 A1 | 10/2003 | Dorenbosch et al. |
| 2005/0013417 A1 | 1/2005 | Zimmers et al. |
| 2005/0242944 A1 | 11/2005 | Bankert |
| 2005/0272368 A1 | 12/2005 | Langsenkamp |
| 2005/0272412 A1 | 12/2005 | Langsenkamp |
| 2006/0059253 A1 * | 3/2006 | Goodman et al. ........... 709/223 |
| 2007/0096894 A1 | 5/2007 | Lemmon |
| 2008/0143548 A1 | 6/2008 | Grimmelmann et al. |
| 2008/0162655 A1 * | 7/2008 | Khedouri et al. ............ 709/206 |
| 2009/0077045 A1 | 3/2009 | Kirchmeier et al. |
| 2009/0131088 A1 | 5/2009 | Kirchmeier et al. |
| 2009/0135008 A1 | 5/2009 | Kirchmeier et al. |
| 2009/0156240 A1 | 6/2009 | Kirchmeier et al. |

* cited by examiner

DIGITAL NOTIFICATION AND RESPONSE SYSTEM

CROSS REFERENCE TO RELATED APPLICATIONS

The present patent application is a continuation-in-part application which claims the benefit, under 35 USC §120, of prior non-provisional application Ser. No. 11/522,723, filed Sep. 18, 2006, which claims the benefit of application Ser. No. 11/117,594, filed Apr. 28, 2005, now issued U.S. Pat. No. 7,130,389, the entirety of which are incorporated herein by reference.

FIELD

The present embodiments relate generally to the creation and delivery of messages, to the routing, and to the verification and collection of responses to the messages. The system is universally applicable to, and independent of, the type of messaging system and device selected by the message recipients.

More particularly, the present embodiments relate to an immediate response information or emergency system.

BACKGROUND

Businesses and their employees are actively involved in sending and receiving information using a variety of messaging formats, systems, and message receiving devices. For example, a traveling employee might, in a single trip away from the office, receive messages sent by fax, pager, electronic mail (e-mail), and voice mail. In addition, the messaging devices by which these messages are actually received might include a pager, a cellular telephone, a paper fax machine, a voice mailbox, or a portable computer connected to the Internet or to a private local area network (LAN). Often these messages will vary in their level of importance. This could affect the delivery methods and/or the nature and timing of any needed response to the message. For example, the arrival of an e-mail message from a particular sender might cause the recipient to fax a report in response. A message reporting a failure in a mission-critical computer system may need an immediate response from a maintenance technician that the message has been received and will be acted on. A message reporting a fire or other disaster may need to be sent simultaneously, or in a notification hierarchy, to multiple members of a disaster response team, with escalating methods of messaging and response gathering to insure that every team member has been notified and has responded in an appropriate fashion. In some group messaging contexts, the post-message processing, organizing, and reporting of multiple message responses can be important in further decision making by the message originator.

The prior art methods implemented in commercially available unified messaging and device specific systems generally provide one-way delivery, with destinations defined by the sender. Unfortunately, prior art systems do not solve the need for originating a message, with attachment and response requirements, in a manner and format that is independent of the type of the device that is to be used for delivering the message to the recipients. Also, prior art systems do not permit the message notification methods to be defined by the recipients, and do not include a facility for automatic processing and organization of message responses. Accordingly, known e-mail, unified messaging and specific device systems using these prior art methods are deficient in responding to these requirements.

A need exists for a system and method for automating and escalating the delivery of messages and collection of message responses implemented through messaging devices of multiple types. The system needs to work in conjunction with recipient rules routing, verification of notification and response, and collection of responses in a predefined format.

A need exists for a digital information and response system to bridge the gap between the government and the public for communication without being limited to one device.

A need exists for a method of communication from an administrator which reaches all possible forms of communication devices, so that all members of the public can be reached.

A need exists for a system that can transmit a message in multiple languages to multiple user devices to inform the public of emergency situations, and general information simultaneously.

The present embodiments meet these needs.

BRIEF DESCRIPTION OF THE DRAWINGS

The detailed description will be better understood in conjunction with the accompanying drawings as follows.

Figure 1:
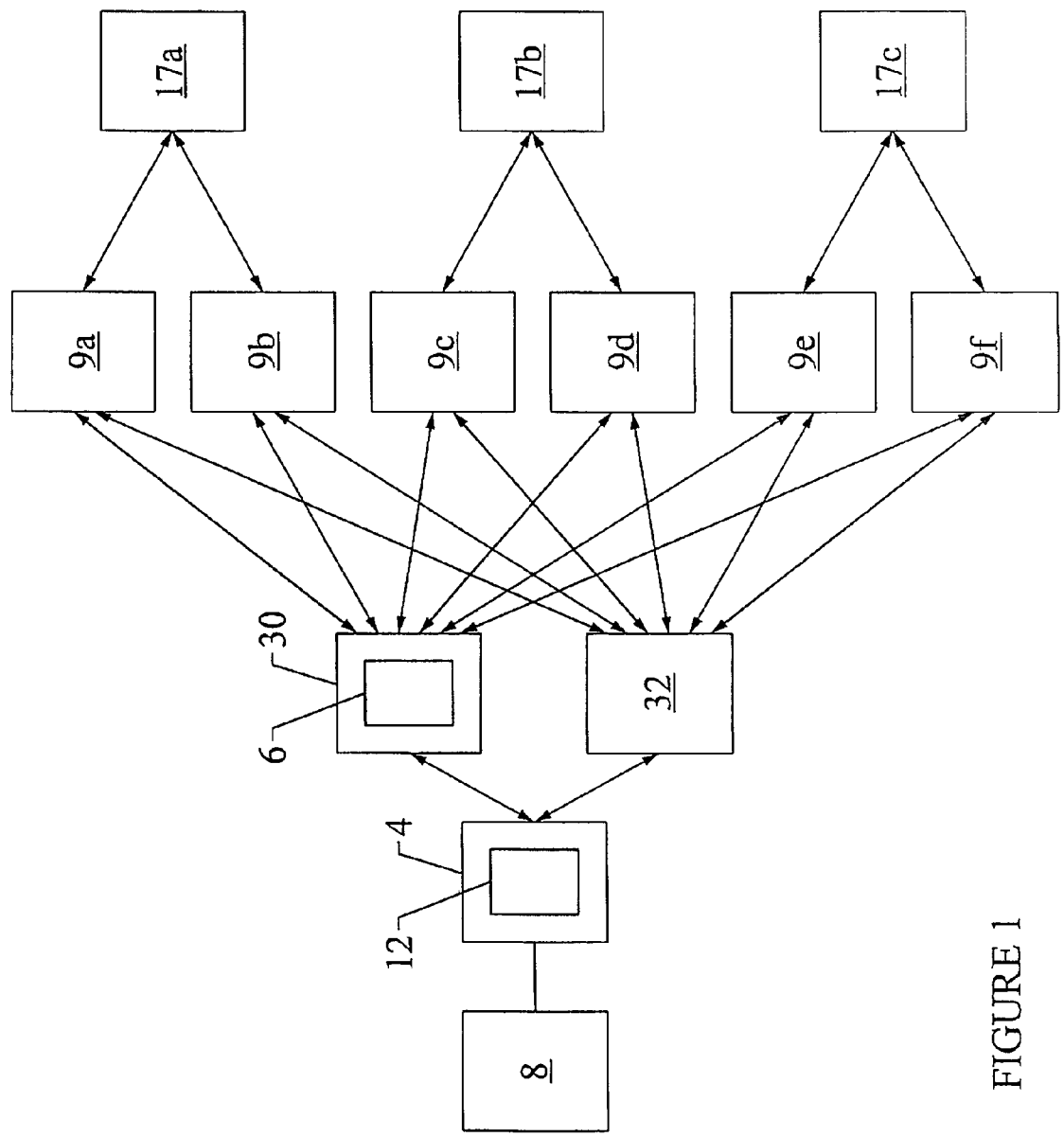
FIG. 1 depicts a representation of an embodiment of a digital notification and response system.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the invention can be practiced or carried out in various ways.

The present embodiments relate to a digital notification and response system for transmitting messages to groups of users and receiving responses. The system can provide immediate response information or emergency information.

The present embodiments relate to the creation and delivery of messages, and to the routing, and to the verification and collection of responses to the messages. The system is universally applicable to, and independent of, the type of messaging system and device selected by the message recipients.

The present embodiments relate to the simultaneous transmission of a message in multiple languages to a user device, wherein the recipient of the message can select the language for transmission to the recipient.

The present embodiments provide a timely and uniform manner to contact numerous users through numerous user contact devices, such as cellular telephones, televisions, LED displays, land phone lines, e-mail addresses, fax machines, pagers, digital displays, handheld wireless devices such as PDAs and Blackberries, instant messaging devices, TTY/TDD devices, webpages, and other similar devices.

The present system can be used to contact users in the case of emergency conditions, such as storms or fire, and in the case of informational situations, such as school closings. Additionally, terrorist threat levels can be transmitted using the present system.

The system can be used to advise office building superintendents and users in the buildings, such as high rise office buildings, concerning building condition updates, parking garage conditions, disabled vehicle conditions, cars with headlights that have been left on, and similar situations.

The present system can be used within the sports industry, such as to facilitate children's soccer games or Major League Baseball games. The system can be used to update fans regarding changed game times, or weather conditions that affect a game start. The system can also be used to update the status of wins and losses on a "real time" basis to user contact devices of fans and parents.

The present embodiments provide a system that is capable of high speed notification and response, in which information is accessed and stored in a dynamic information database. The system can be used to contact users automatically when specific conditions arise or to contact users when a contact is initiated by an administrator. The system can be used to contact a large number of users in a systematic manner, based upon predetermined priorities.

The present embodiments can be used save lives by notifying large groups of individuals concerning very dangerous situations quickly, through multiple different contact devices. The system can be used to stop rumors or erroneous information indicating that a situation is safe. This system can prevent panic and chaos, by sending a consistent message to all users.

The embodied system provides other benefits, such as non-emergent, general information updates. For example, a message can be sent, such as "bring a flower to your teacher tomorrow because it is her birthday," to all parents of students of a second grade teacher.

The present system includes an administrator interface for preparing and transmitting messages over a network from an administrator to at least one group of users. Each member of the group is contemplated to have at least one user contact device. Messages are transmit using user selected priority information.

Groups of users can include police departments, commercial property managers, companies, parents of children, fire departments, school systems, adults, security companies, donors, utility customers, one or more branches of the military, trade show attendees, voters, parishioners, union organizations, such as the United Auto Workers Union, union members, other similar groups and individuals, and combinations thereof.

The system further includes a dynamic information database, which is used to store user contact data for each member of the group. The user contact data can include an user name, address, phone number, an user device address, social security number, account code, an instant message address, a text message address, and combinations thereof. The user contact data can also include user contact device information and user selected priority information, which indicates a contact order for each contact device of a user.

It is contemplated that the user selected priority information can indicate which user contact devices of a specified user are to be contacted before other user contact devices of the specified user. For example, a user could identify a preference that his or her work telephone be contacted before contacting the user's home telephone.

User contact devices can include handheld wireless devices, wireless phones, land phones, e-mail addresses, fax machines, pagers, digital displays, such as a television, a computer network, LED displays, such as a traffic display, Jumbotron™, or banner display, webpages, TTY/TDD devices, instant messaging devices, and combinations thereof.

Additionally, user selected grouping information, which includes at least one group associated with each user contact device, is stored in the dynamic information database. Groups associated with each user contact device can include, for example, all consumers of electric power from Reliant Power Company in Houston Tex.

The dynamic information database can also store response data, which corresponds to user response information that indicates receipt of a message by a user contact device, or when insufficient user contact device information exists to contact one or more user contact devices.

For example, a transmitted message can be a request for updated contact device information and user selected priority information, and a user contact device can be used to respond to the message. The response can provide updated contact device information as well as updated user selected priority information.

The dynamic information database can be a SQL™ database, a MySQL™ database, an Oracle™ database, another similar industry standard database, or combinations thereof.

In an embodiment, the present system can include an encryption module in communication with the dynamic information database for encrypting the dynamic information database. The dynamic information database can have one or more encryption keys, such as a 1024 bit AES encryption key.

In an embodiment, installing the dynamic information database can be installed on a solid state hard drive server.

The administrator interface can be used to form at least one message. The one or more messages can include prewritten or prerecorded messages stored in the dynamic information database for subsequent use by the administrator. The prerecorded message can be an audio or video recording. The messages can also include custom messages for any condition or situation.

The administrator interface can be adapted to transmit one or more messages at preset timed intervals to one or more user contact devices.

The administrator interface can have a processor with data storage and computer instructions for creating custom messages.

The administrator interface can be used for creating real time customized or predefined messages for transmission by an administrator.

In an embodiment, the message can have a designation indicating the priority of the message, such as low priority, general priority, significant priority, high priority, and severe priority.

In another contemplated embodiment, the system can include a document uploaded to a website. The message can include a link to the document. The system can include computer instructions that prevent viewing of the document after the document has been viewed a preset number of times. For example, the computer instructions could prevent viewing of the linked message after a user has viewed the website 10 times. The user would need to seek approval of the administrator to view the linked website after the predefined number of viewings has been exceeded.

In a contemplated embodiment, the message can means for include activation of an audio alarm, such as a tone, bell, siren, spoken audio message, or other similar audio alarms, a visual alarm, such as a blinking light or visual text message, a designated ring tone, or combinations thereof. The designated ring tone can be selected by the user or the manufacturer of the contact device.

It is also contemplated that in an embodiment, the message can include a survey, such as a series of two or more questions requesting a user response. Questions can relate to satisfaction of the user relating to services provided by the administrator, preferences for political candidates, or any other type of information related or unrelated to the present system.

Survey responses can be stored in the dynamic information database and can optionally be used to generate one or more reports.

The administrator interface can be adapted for communication with a local area network, a wide area network, a virtual private network, an asynchronous transfer mode network, a synchronous optical network, a call center interface, a voice mail interface, a satellite network, a wireless network, a WIFI network or a WiMax network, other similar interfaces and systems, or combinations thereof.

An administrator initiates distribution of the message using the user selected grouping information and the user selected priority information. The user selected priority information can be used to ensure that a critical user is contacted before a non-critical user.

After the transmission of the message to the user contact device, the administrator interface can be adapted to receive a response from one or more user contact devices.

For example, when the administrator interface first fails to contact a user on a first priority contact device, such as the telephone number 713-862-9090, an error in transmission message can be transmit back to the administrator interface. The dynamic information database can then provide instructions to transmit a request for updated user contact device information to a second user contact device, such as the e-mail address Darren@Techradium.com. The user can then see the message and correct the erroneous phone number by transmitting a response containing the correct phone number, 713-862,9091. It is contemplated that a request to update user contact device information can be sent to third or fourth user contact devices in sequence or simultaneously. In another contemplated embodiment, one or more users can be permitted to update user contact data from a user contact device at any time.

It is further contemplated that the reply can include a replay response from one or more user contact devices requesting the administrator interface to retransmit a message. For example, the message could prompt the user to "Press 1 if the user wants to hear this message again." The administrator interface could have a function which stores messages, which can be sent to the user contact devices repeatedly. The repeated transmission can be based on a predefined interval, or the message can be selectively sent by the administrator when the transmission message is necessary.

The dynamic information database be adapted to, when activated by a replay or retransmission request, cause the instant retransmission of one or more messages sent to the user based on the message time stamp.

For example, a request for retransmission can be sent after a user receives an emergency message. A processor in communication with the administrator interface can locate the user in the dynamic information database, search messages sent to that particular user, retrieve the last message sent to the user, and retransmit or play the message at that moment in time, instantly at the moment of the request, without requiring the user to enter any passcodes or additional commands. This feature is very useful when time is of the essence, or when the user is injured or in a dangerous situation.

It is also contemplated that the present method can include a searchable list of the last message sent to one or more user contact devices in the dynamic information database.

An administrator can be a person, a computer, a digital notification and response system; an analog emergency notification system; a mass notification system, such as a public notification system, a telephone emergency alert system, an e-mail emergency alert system, an instant messaging alert system, a streaming media alert system, which can be video or another digital content stream, an application programming interface, or any combinations thereof. An application programming interface can control the administrator interface and provide additional code or instructions to the administrator interface for creating and transmitting messages to user contact devices. The instructions can be XML code, flat text file, or similar code. The application programming interface would receive information from a tool developed by a third party company and deploy the use of the tool.

In an embodiment, computer instructions in the dynamic information database can be used to classify one or more administrators to have restricted access to information in the dynamic information database, the administrator interface, or combinations thereof. This embodiment can be of particular use when it is desirable to allow agents of administrators to access the dynamic information database, or when multiple administrators responsible for separate groups of users use a single notification and response system to transmit messages to their specific groups of users without accessing information on user groups for which they are not responsible.

It is contemplated that the messages can be transmit through at least two industry standard gateways simultaneously. Industry standard protocols can include a Megaco/H.248 protocol, simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, a SMS/MMS gateway, and combinations thereof.

In an embodiment of the system, a third party can communicate with a processor in communication with the dynamic information database. The third party can communicate with the processor using the administrator interface. The third party can instruct the to perform a sequence of steps that calls at least one first responder to action to investigate a problem. The problem can be a terrorist problem, a security problem, a bomb threat, or other emergency situations. The system can act like a tip line to the security office.

In a contemplated embodiment, the present system can include computer instructions to instruct at least one processor controlling the administrator interface to only transmit one or more messages within a predefined time interval. The system can further include a manual override to suppress the processor from complying with the computer instructions, allowing messages to be sent outside of the predefined time interval, or causing messages not to be sent during the predefined time interval.

In a contemplated embodiment, the present system can include text file to sound file converter, such as Nuance™ RealSpeak technology, Microsoft™ text-to-speech software, Speech server, text-to-speech software from AT&T™ Natural Voices™, Loguendeo™, or combinations thereof, for transforming messages from text files to sound files. This embodiment allows users to receive sound messages through a telephone or a contact device having a speaker, which is of great benefit to users who cannot afford computers, cellular telephones, or other devices having textual displays, or to users who live in areas where wireless service or internet access is limited or non-existent. This embodiment is also especially beneficial for enabling users having impaired vision to receive notification in the form of sound messages.

It is also contemplated that a text-to-sound file converter, can be used to allow spoken words from an administrator or agent authorized by the administrator to be transmit as text, sound, or combinations thereof.

In an embodiment, a language converter, such as Systrans™ or Babel Fish™, or other commercially available language converters, can be used to translate the message to a user contact device to a language selected by the user.

The present system can also include, in an embodiment, reporting information stored in the dynamic information database for generating a report. Reporting information can include dates and times when one or more messages were sent, dates and times one or more messages were received, content of messages, recipients of one or more messages, recipient information for one or more messages, and combinations thereof. The report can be a customized report, such as a report identifying all user contact devices having a user answer.

In an embodiment, the present system can include one or more new groups of users formed by the administrator interface using user contact data and instruction from the administrator.

The administrator interface can also be used to remove duplicate user contact devices the user contact data prior to transmitting messages. For example, a duplicate user contact device could be a home telephone number, where both a husband and a wife are users.

Other similar administrative and maintenance functions relating to the information in the dynamic information database are also contemplated.

The present system can also include a training mode with the administrator interface. The training mode is contemplated to enable administrators to train on the digital notification and response system without transmitting messages. This embodiment is especially beneficial for ensuring that messages are effectively and properly transmitted by trained administrators during times of emergency.

In an embodiment, the present system can include resorted user contact devices, sorted based on administrator selected user contact data. A message can be transmitted to the user contact devices that have been resorted. It is contemplated that resorting the user contact devices can include associating one or more user contact devices with different groups, altering the priority information for one or more user contact devices, ordering each user contact device within one or more groups by a selected item of user contact data, such as the type of contact device.

The message transmitted to the resorted user contact devices can indicate any changes that have been made, or the message can indicate only that resorting has occurred.

It is also contemplated that messages and responses can be transmitted simultaneously to multiple devices of a single individual, over one or multiple networks, in multiple languages.

The message is received by the at least one user contact device, and the at least one user contact device can transmit a response through the industry standard gateway protocols to the dynamic information database.

Use of the present system can be understood in light of the following example:

User contact data for multiple users, such as all members of a neighborhood home owners' association, can be stored in a dynamic information database, such as an Oracle™ database. The user contact data can include the names and addresses of each user, as well as user contact device information, such as a telephone number, e-mail address, or IP address of each user's user contact device(s). User contact devices can include home telephones, business telephones, cellular telephones, e-mail addresses, one or more computers or handheld wireless devices, and other similar devices.

User selected priority information is also in the dynamic information database, which includes a contact order for each user contact device. For example, one user may indicate a preference for being contacted using his home telephone before using his e-mail address. Each user can indicate a differing preference for the order in which his or her contact devices are to be contacted, and the contact order can be stored in the dynamic information database.

Additionally, the dynamic information database includes user selected grouping information, which classifies each user into one or more groups, such as members of the home owner's association who are behind on their association dues, or members of the home owner's association who reside in a flood zone.

During an emergent situation, such as an impending flood in the neighborhood, an administrator, such as the head of the home owner's association, can use his computer to access the association website, which in this example can function as the administrator interface. The administrator can input a message to the computer, such as "Major flooding is expected this evening, beginning at 10:00 PM. All residents on Charter Drive are advised to evacuate. All other residents are urged to remove all valuable belongings from basements and lower floors of their homes and to expect power outages."

The administrator can then initiate distribution of the message, which will be transmitted over a network, such as the internet, or an intranet specific to homes in the home owner's association, using the user selected grouping information and user selected priority information. The user selected priority information is used to ensure that a critical user is contacted before a non-critical user.

For example, users who reside in a flood zone can be grouped as critical users, and can receive the message before other users. It is also contemplated that emergency response personnel can be grouped as critical users and receive the message prior to non-critical users.

The message is transmit through two industry standard gateways, such as a SMTP and a SIP gateway, simultaneously. This redundancy maximizes the chance that the message will reach each user.

Each contacted user contact device can transmit a response upon receiving the message, which can be an audio tone file, a visual response, or a textual response, through the two industry standard gateways, and the response can be stored in the dynamic information database. Owners of user contact devices that fail to respond to the message can be contacted directly.

With reference to the figures, FIG. 1 examples an embodiment of a digital notification and response system, wherein an administrator (8), such as a city official, can transmit one or more messages (6), such as emergency messages relating to severe weather, to one or more user contact devices (9a through 9f), such as telephones, pagers, e-mail addresses, or handheld wireless devices, using an administrator interface (4), which can be any type of computer or handheld device having an interface for communicating with a network. The user contact devices can associated with groups of users.

The administrator (8) can be a person, a computer, an analog emergency notification system, or another digital notification and response system or the like. The administrator (8) interacts with the administrator interface (4) to begin the process of sending a message to the user contact devices (9a through 9f). The administrator interface (4) can be in communication with a local area network, a wide area network, a virtual private network, an asynchronous transfer mode network, a synchronous optical network, a call center interface, a voice mail interface, a wireless network, a satellite network, or other similar means to transmit a message to numerous contacts.

The message can be a text message, a numerical message, one or more images or a combination of these. The message can be encoded. The message can include a designation that identifies the importance the message. Examples of these designations include low priority, general priority, significant priority, high priority, and severe priority. The designations can coincide with the Homeland Security's five-color system. For example, the designations can be color-coded, such as green for a low priority message, blue for a preparedness message or general priority message, yellow for a cautionary message such as a significant priority, orange for an emergency message or high priority message, or red for a critical message with a severe priority. These priority levels can be customized to corporate levels of emergencies, or they can be tailored to standards for a particular industry, like Building owners and managers standards codes for risks or emergencies in a building.

As seen in FIG. 1, the message (6) is transmitted to one or more user contact devices (9a through 9f). Examples of usable user contact devices include handheld wireless devices, wireless phones, land phones, e-mail addresses, digital displays, and LED display, fax machines, pagers, instant messenger, cellular telephones, instant messaging devices, tty/tdd devices, webpages, and other similar devices.

The message (6) is stored on a dynamic information database (12), such as a SQL™ database. The message can be a prewritten message stored in the database for subsequent use by the administrator or can be generated from the dynamic information database (12) based upon inputs from the administrator and transmitted using the administrator interface.

Figure 2:
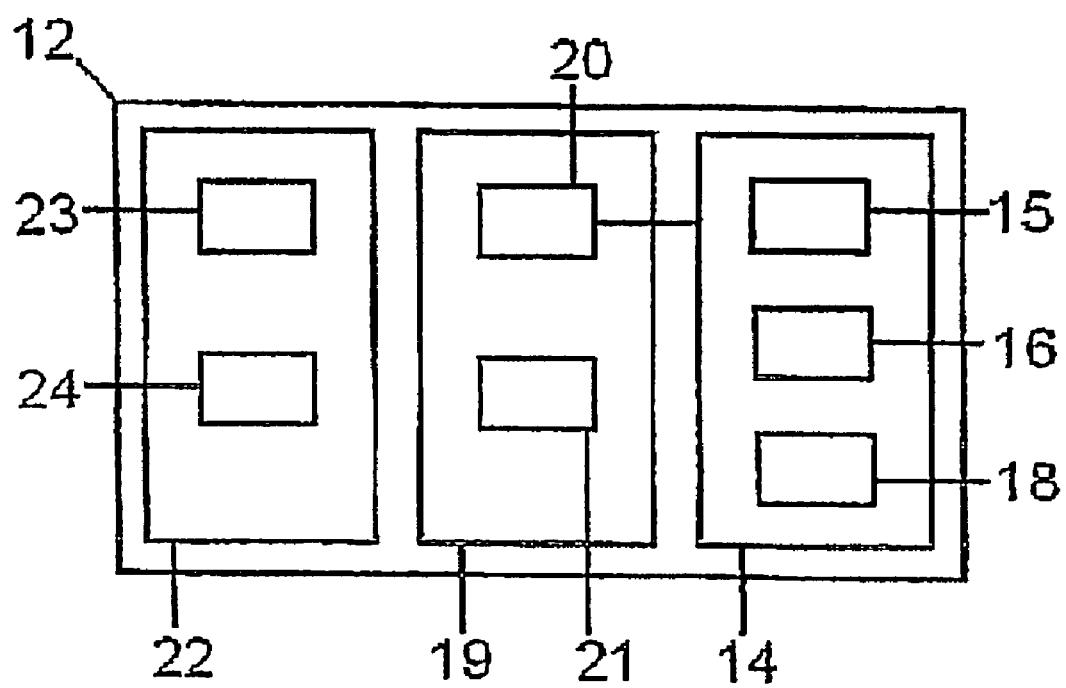
FIG. 2 depicts a representation of an embodiment of a dynamic information database associated with a digital notification and response system.

FIG. 2 shows a schematic of the dynamic information database (12). The dynamic information database (12) includes three sections: user contact data (14), user selected grouping information (19), and response data (22). The dynamic information database (12) can be an SQL™ database, MySQL™ database or other industry standard databases, an Oracle™ database, or other similar database that can organize information in a similar manner.

The user contact data (14) in the dynamic information database (12) includes user contact information (15), user selected priority information (16), and user selected language for the message (18). The user contact data (14) includes information associated with the user of the user contact device. The user, within the scope of this application, is a person that can receive a message, send a message, respond to a message, or combinations thereof. Examples of users include a company, employees of company, an individual, a parent of a child, a fire department, a coach of a youth sports team, a team manager of a youth sports team, the manager of a major league sports team, sports team representative, mom or dad of a sports team player, a police department, a commercial property manager, a school system, an adult, a security company, or combinations thereof.

The user contact information (15) includes information concerning both the user contact device and the user. The user contact information (15) can include an e-mail address, an internet protocol (IP) address, a phone number, and combinations thereof. The user contact information (15) can further include the user's name, the user's address, the user's phone number, the user's device address, the user's social security number, an account code, and combinations thereof. Each user contact device can include information that is unique to each individual user contact device or can include information that is common to all user contact devices. For example, a serial number for a cell phone, a mac address for an Ethernet card, and other similar information can be included.

The user contact data (14) further includes user selected priority information (16). The user selected priority information (16) is used to indicate a contact order for various user devices of the user. The contact order is used to direct the order in which the dynamic information database (DID) transmits a message to the user contact devices (9a through 9f).

The user contact data (14) can include information beyond the examples listed in order to aid the DID in contacting the user contact devices.

Continuing with FIG. 2, the user selected grouping information (19) in the dynamic information database (12) is used to group users together into separable and identifiable groups for ease of contact by an administrator. The user selected grouping information (19) can be used to define at least one group.

User (17a) can be a group of users, associated with contact devices (9a) and (9b), which can represent multiple user contact devices. User (17b) can be a group of users, associated with contact devices (9c) and (9d), which can represent multiple contact devices. User (17c) can be a group of users, associated with contact devices (9e) and (9f), which can represent multiple contact devices. By grouping the users, the system provides the benefit of more efficient delivery of information without having to treat each user individually. Grouping more efficiently defines message recipients, which speeds the delivery of the message.

The user selected grouping information includes a predefined group identified in the dynamic information database. The predefined group can be identified by the administrator or by another user in advance to sending the message. Examples of groupings include parents of a second grade class, an alumni class from a specific year, members of the Bad News Tigers little league soccer team, all Tuesday night home game subscribers to a certain major league baseball team, executives of a given company, hazmat response teams, and other similar groupings.

The user selected grouping information (19) further includes a priority order for contacting a user within the group (20). The priority order directs the administrator interface (4) as to the order in which the interface should contact the individual contact devices with the message. The priority order provides the benefit of ensuring that the most critical users receive the message first in case time is not available to contact all of the users. The priority order also provides the benefit that all users get contacted with equal priority, rather than a discriminating message delivery priority. The priority order guarantees that all users get contacted to on a preferred device first.

The response data (22) in the dynamic information database (12) is directed towards information based upon whether the user contact device and, in turn, the user, received the message. The response data (22) includes user response information (23) that indicates whether the user (17a through 17c) has received the message (6). The user response information (23) is gathered by the dynamic information database (12). The response data (22) further includes "error-in-response" information (24) that indicates the user contact data (14) is insufficient and can not be delivered properly. The error in response information (24) can also indicate that an email address or phone number is simply invalid.

Returning to FIG. 1, the administrator (8) can initiate a distribution of one or more messages (6). The system can be initiated automatically. Fire alarms when set off, can automatically alert the system, and then the system can automatically advise a user. Another example is that the system can tie to a tracking system, so that if a child misses certain periods of school, the system can advise the parent that the student is missing those classes.

The system uses the information in the dynamic information database (12) namely the user selected grouping information (19), user selected priority information (16), and the priority order (21), to determine who to contact and in what order.

The message (6) is transmitted through at least two industry standard gateways (30 and 32) simultaneously. By transmitting the message (6) through numerous gateways, the system provides redundancy in order to ensure the message is relayed to the users. An example of an industry standard gateway is a SMTP gateway, a SIP, an H.323, an ISDN gateway, a PSTN gateway, a softswitch, or the like. The priority order directs the administrator interface (4) to contact a first group of user contact devices (9a and 9b) indicated as a first contact. After all of the user contact devices in the first contact have received the message, the priority order directs the administrator interface (4) to contact a second group of user contact devices (9c and 9d) indicated as a second contact. Then the administrator interface continues to contact user contact devices (9e and 9f) based on the priority order, until all user contact devices are reached and a response is provided from the user contact devices.

Once the message is received by a user contact device, the user contact device (9a through 9e) transmits a response back through the industry standard gateways (30 and 32) to the dynamic information database (12). The dynamic information database (12) stores the responses and the unique address of each user contact device.

In an alternative embodiment, the system can include reporting information in order to generate reports based upon information in the dynamic information database (12). The reports can be generated by the administrator, the user, a group, or combinations thereof. The reports can include a date the message was sent, such as Sep. 12, 2007, a time the message was sent, such as 3:32 PM, a date the message was received, such as Sep. 12, 2007, a time the message was received, such as 3:36 PM, content of the message, which can include any part or the entirety of the message, a recipient of the message, which can include a user name, recipient information related to the recipient of the message, such as a user address, telephone number, e-mail address, and/or other similar information, and combinations thereof. Other examples include the name of the person who received the message, a copy of the voice mail, a time when an e-mail was accessed, the time when a fax is printed and so on. The administrator can create custom designed reports, or standard reports can be generated from the dynamic information database for use by the administrator.

In an alternative embodiment, the system can include a language converter, such as Systrans™ or Babelfish™, to translate a text message to second language. The language converter is often referred to as a text translator. For example, the language converter can convert the message from English to a second language, such as Korean, Chinese, Vietnamese, French, English, Spanish, Italian, Norwegian, Swedish, German, Japanese, Russian, or Portuguese. The language converter is beneficial because not all users speak the same language and this breaks down the communication between groups of people by language. The system allows the user to designate a specific language in which to receive the message. The chosen language is stored in the dynamic information database (12) with the user contact data (14).

In an alternative embodiment, the system can include a text-to-sound file converter, such as Microsoft Speech Server™. The text-to-sound file converter can be used to translate a message from text to a sound file. The text-to-sound file converter is beneficial because it enables delivery of the message consistently using the same voice, with the same accent, same dynamic, and same delivery speed. The text-to-sound file converter enables individuals with disabilities, namely visual impairment, to also receive the consistent message.

The embodiments have been described in detail with particular reference to certain preferred embodiments, thereof, but it will be understood that variations and modifications can be effected within the scope of the embodiments, especially to those skilled in the art.

What is claimed is:

1. A digital notification and response system, comprising:
   a. an administrator interface for preparing and transmitting a message over a network from an administrator to at least one group comprising at least one contact device of a user, using a user selected priority information, wherein the administrator interface is in communication with a processor and data storage;
   b. a dynamic information database in communication with the administrator interface for storing:
      user contact data for each member of each group, wherein the user contact data comprises user contact device information and the user selected priority information that indicates a contact order for each contact device of a user;
      user selected grouping information defining each group; and
      response data corresponding to user response information that indicates when insufficient user contact device information exists to contact the user contact devices;
   wherein the administrator interface is in communication with a processor and data storage initiates distribution of the message using the user selected grouping information and the user selected priority information, wherein the use selected priority information is used to ensure that a critical user is contacted before a non-critical user, and wherein the message is transmitted through at least two industry standard gateway protocols simultaneously, wherein one of the two industry standard gateway protocols comprises a SMTP gateway, a SIP gateway, an H.323 gateway, an ISDN gateway, a PSTN gateway, an SMS gateway, an MMS gateway, a softswitch, and combinations thereof, and wherein the contact device transmits a response through the industry standard gateway protocols to the dynamic information database.

2. The system of claim 1, further comprising a third party using the administrator interface to instruct a processor in communication with the dynamic information database to perform a sequence of steps that calls at least one first responder to action to investigate a problem.

3. The system of claim 1, further comprising an encryption module for encrypting the dynamic information database.

4. The system of claim 3, wherein the encrypted dynamic information database has at least one encryption key.

5. The system of claim 1, wherein the data storage comprises computer instructions for creating custom messages.

6. The system of claim 1, wherein the message comprises a link to a website with at least one document.

7. The system of claim 6, wherein the website further comprises control computer instructions for preventing viewing of the website after a predefined number of viewings has occurred.

8. The system of claim 1, wherein the administrator interface is adapted to transmit the message to the contact devices at preset time intervals.

9. The system of claim 1, wherein the administrator interface is adapted to receive a response from the user contact device after the at least one message has been.

10. The system of claim 1, further comprising a text file to sound file converter for transforming the message from a text file to a sound file or from a sound file to a text file.

11. The system of claim 1, further comprising reporting information, wherein the reporting information is used to generate a report.

12. The system of claim 11, wherein the reporting information comprises a date the message was sent, a time the message was sent, a date the message was received, a time the message was received, content of the message, a recipient of the message, recipient information for the message, and combinations thereof.

13. The system of claim 1, wherein the administrator interface is adapted to communicate with a local area network, a wide area network, a virtual private network, an asynchronous transfer mode network, a synchronous optical network, a call center interface, a satellite network, a wireless network, a WIFI network, a WiMax network or combinations thereof.

14. The system of claim 1, wherein the administrator is a person, a computer, a digital notification and response system, an analog emergency notification system, a mass notification system, an application programming interface, and combinations thereof.

15. The system of claim 1, wherein the message is a pre-written or prerecorded message stored in the dynamic information database for subsequent use by the administrator.

16. The system of claim 1, wherein the dynamic information database is an SQL™ database, MySQL™ database, an Oracle™ database, another industry standard database, or combinations thereof.

17. The system of claim 1, wherein the user contact data is a member selected from the group consisting of: an user name, an user address, an user phone number, an user device address, a social security number, an instant message address, a text message address, an account code, and combinations thereof.

18. The system of claim 1, wherein the message comprises a designation selected from the group consisting of: low priority, general priority, significant priority, high priority, and severe priority.

19. The system of claim 1, wherein the dynamic information database is stored on a solid state hard drive server.

20. The system of 1, wherein the at least one group of users is: a police department, a commercial property manager, a company, a parent of a child, a fire department, a school system, an adult, a security company, a donor, an utility customer, a branch of the military, a trade show attendee, at least one union member, a union, a voter, a parishioner, or combinations thereof.

21. The system of claim 1, wherein the contact device is a handheld wireless device, a wireless phone, a land phone, an email address, a fax machine, a pager, a digital display, a LED display, a webpage, a TTY/TDD device, an instant messaging device, or combinations thereof.

22. The system of claim 1, further comprising a language converter to translate the message to the user contact device to a user selected language.

23. The system of claim 1, further comprising at least one new group of users, wherein the at least one group of users are formed using user contact data and instruction from the administrator.

24. The system of claim 1, wherein the message comprises a means for activating an audio alarm, a visual alarm, a designated ring tone, or combinations thereof.

25. The system of claim 14, wherein the application programming interface controls the administrator interface and provides at least one instruction to the administrator interface for creating and transmitting messages to the user contact devices.

26. The system of claim 1, wherein the administrator interface comprises a training mode, and wherein the training mode enables administrators to train on the digital notification and response system without transmitting messages.

27. The system of claim 1, further comprising resorted user contact devices, wherein the resorted user contact devices are sorted based on administrator selected user contact data, and wherein a resorted message can be transmitted to at least one resorted user contact device.

28. The system of claim 1, wherein the message comprises a survey for requesting additional information from users.

29. The system of claim 1, wherein the administrator interface is adapted to enable at least one of the users to transmit a request for message retransmission based on a message time stamp, through one of the industry standard gateways to the dynamic information database, and wherein the dynamic information database is adapted to instantly retransmit any message sent to the user based on the message time stamp.

30. The system of claim 1, further comprising management computer instructions to instruct a processor controlling the administrator interface to only transmit the at least one message within a predefined time interval.

31. The system of claim 30, further comprising a manual override, wherein the manual override is adapted to bypass the computer instructions instructing the processor to transmit the at least one message within the predefined time interval.

* * * * *